US012271515B1

United States Patent
Yee

(10) Patent No.: US 12,271,515 B1
(45) Date of Patent: Apr. 8, 2025

(54) PROCESSING PERFORMANCE ADJUSTMENT USING BIOSIGNALS

(71) Applicant: ATI Technologies ULC, Markham (CA)

(72) Inventor: Michael Yee, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/395,065

(22) Filed: Dec. 22, 2023

(51) Int. Cl.
*G06F 3/01* (2006.01)
*G06T 1/20* (2006.01)
*G06T 11/00* (2006.01)

(52) U.S. Cl.
CPC .............. *G06F 3/011* (2013.01); *G06T 1/20* (2013.01); *G06T 11/00* (2013.01)

(58) Field of Classification Search
None
See application file for complete search history.

(56) References Cited

U.S. PATENT DOCUMENTS

2016/0025971 A1\* 1/2016 Crow ................ A61B 3/113
345/156

\* cited by examiner

*Primary Examiner* — Duane N Taylor, Jr.
(74) *Attorney, Agent, or Firm* — Greenberg Traurig, LLP

(57) ABSTRACT

The disclosed device can receive a biosignal and, using user input predictions based on the biosignal, pre-render a display frame. The device can also subsequently receive a user input, output the pre-rendered display frame based on the user input confirming the user input predictions and flush the pre-rendered display frame otherwise. The device can also modulate computing performance and power based on computing demands predicted from the biosignal. Various other methods, systems, and computer-readable media are also disclosed.

20 Claims, 10 Drawing Sheets

PROCESSING PERFORMANCE ADJUSTMENT USING BIOSIGNALS

BACKGROUND

A user can interact with a computing device using a peripheral device (e.g., such as a mouse, keyboard, touchscreen, an input device for active user interaction, etc.). Each stage between the user producing a user input with the peripheral device and the computing device providing a display output contributes latency to an overall latency or input lag. Although users often do not notice input lag, in certain cases, such as processing and/or rendering heavy cases, users can undesirably experience input lag. For instance, users can wait for a noticeable delay between providing the user input and seeing a resulting display output. Although the computing device can be adjusted or otherwise optimized, particularly with respect to rendering and/or display stages, such adjustments can reduce display fidelity/performance which can be at the expense of user experience.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
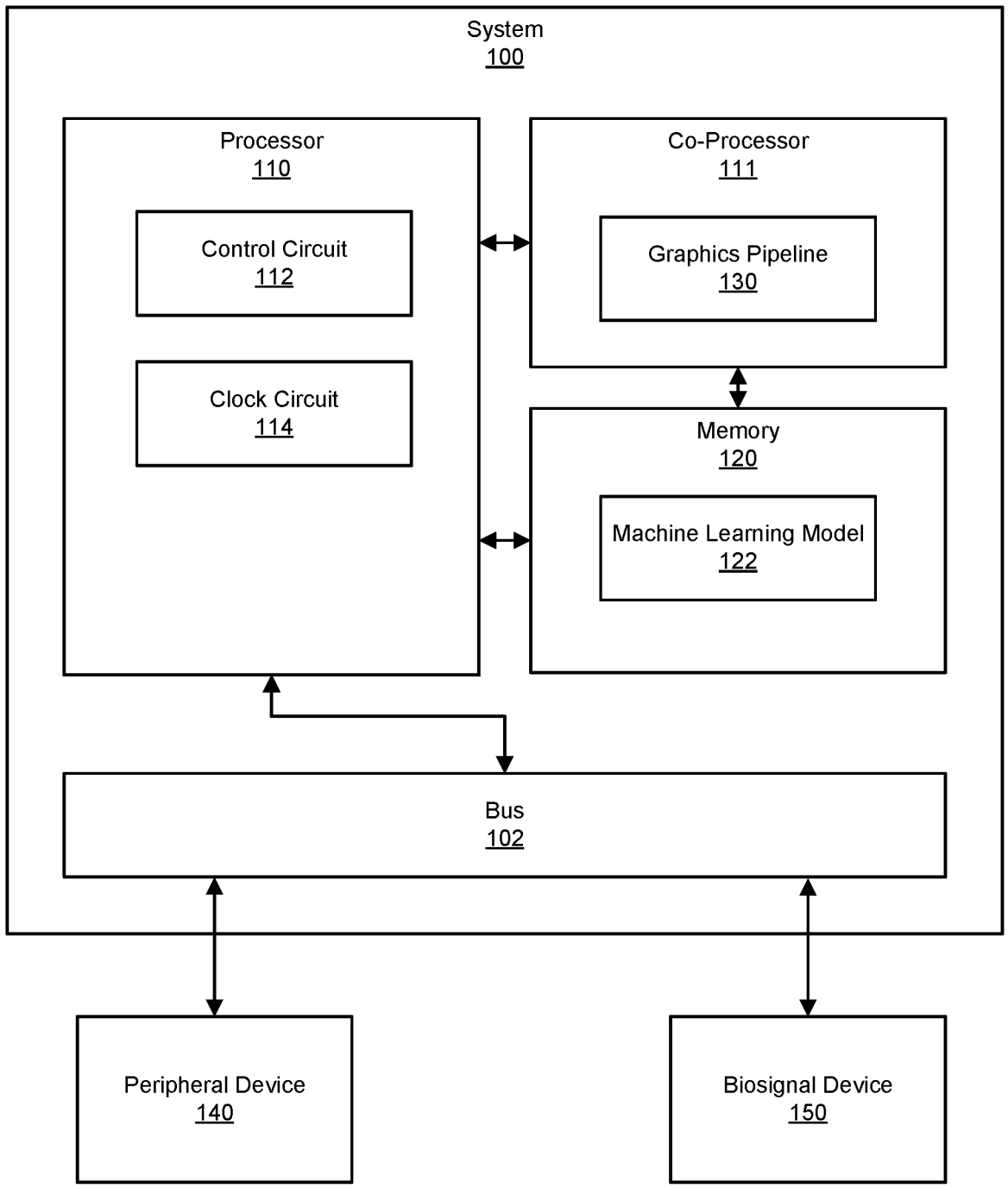
FIG. 1 is a block diagram of an exemplary system for processing adjustments such as input lag reduction and/or power reduction using biosignal-based inputs.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to input lag or power reduction using biosignals. As described herein, a biosignal can generally represent one or more signals measured or otherwise detected from physiology, which can include electrical signals (e.g., electroencephalograph (EEG), electromyography (EMG), electrocardiograms (ECG)) as well as other signals (e.g., measuring biorhythm changes, eye movements, etc.) which are often passively measured. As will be explained in greater detail below, implementations of the present disclosure pre-render a display frame that is predicted based on a biosignal-based input that precedes a user input. After receiving the user input the pre-rendered display frame can be displayed if the pre-rendered display frame conforms to the user input or can otherwise be flushed. By using a biosignal-based input as a predictive input for a subsequent user input, the systems and methods described herein can advantageously reduce input lag by predicting the user input, and pre-rendering display frames based on the prediction. In addition, the systems and methods provided herein can use biosignal-based predictions for future processing needs and accordingly adjust computing performance levels preemptively, such as adjusting power states. Thus, the systems and methods described herein can improve functioning and efficiency of computing devices as well as improve power management. In addition, the systems and methods described herein improve the technical fields of user inputs, biosignal measurement, graphics rendering, display output, and system clock adjustment.

In one implementation, a device for processing performance adjustment using biosignal-based inputs includes a control circuit configured to (i) receive a biosignal-based input, (ii) predict a processing performance adjustment based on the biosignal-based input, and (iii) apply the predicted processing performance adjustment.

In some examples, the processing performance adjustment corresponds to pre-rendering a predicted display frame in a graphics pipeline based on the biosignal-based input. In some examples, the control circuit is configured to receive a user input and confirm the predicted display frame conforms to the received user input. In some examples, the control circuit is configured to flush the predicted display frame from a graphics pipeline when the predicted display frame conflicts with the received user input.

In some examples, pre-rendering the predicted display frame includes predicting, based on the received biosignal-based input, a user input action and rendering, based on the predicted user input action, the predicted display frame. In some examples, predicting the user input action further comprises predicting, using a machine learning model trained to convert biosignal-based inputs into user input actions, the user input action from the received biosignal-based input. In some examples, the control circuit is further configured to use the user input as feedback for the machine learning model.

In some examples, the control circuit is configured to predict the processing performance adjustment by predicting, based on the received biosignal-based input, a change in user input activity rate. In some examples, the control circuit is configured to apply the processing performance adjustment by adjusting a power state of the device based on the predicted change in user input activity. In some examples, adjusting the power state further includes decreasing the power state in response to predicting a reduced user input activity rate, and increasing the power state in response to predicting an increased user input activity rate.

In some examples, decreasing the power state includes at least one of decreasing a clock frequency, decreasing a frame rate, decreasing a voltage level supplied to one or more components of the device, and power gating the one or more components of the device. In some examples, increasing the power state includes at least one of increasing a clock frequency, increasing a frame rate, increasing a voltage level supplied to one or more components of the device, and exiting power gating the one or more components of the device.

In some examples, pre-rendering the display frame further includes predicting, based on the received biosignal-based input, a user input action, and predicting, based on the predicted user input action, the display frame. In some examples, predicting the user input action further includes predicting, using a machine learning model trained to convert biosignal-based inputs into user input actions, the user input action from the received biosignal-based input. In some examples, the control circuit is further configured to use the user input as feedback for the machine learning model.

In one implementation, a system for processing performance adjustment using biosignal-based inputs includes a graphics processing unit including a graphics pipeline, and a control circuit configured to (i) receive a biosignal-based input, (ii) predict a user input action from the received biosignal-based input, (iii) pre-render, using the graphics processing unit, one or more display frames based on the predicted user input action, (iv) receive a user input, and (v) flush the one or more pre-rendered display frames from the graphics pipeline when the predicted user input conflicts with the received user input.

In some examples, the control circuit is configured to instruct the graphics pipeline to output the one or more pre-rendered display frames based on the predicted user input action conforming with the received user input. In some examples, the control circuit is configured to predict, based on the received biosignal-based input, a reduced user input activity, and in response to predicting the reduced user input activity, reduce a power state of the system. In some examples, the control circuit is configured to predict, based on the biosignal-based input, an increased user input activity, and in response to predicting the increased user input activity, increase a power state of the system.

In some examples, predicting the user input action further includes predicting, using a machine learning model trained to convert biosignal-based inputs into user input actions, the user input action from the received biosignal-based input. In some examples, the control circuit is further configured to use the user input as feedback for the machine learning model.

In one implementation, a method for processing performance adjustment using biosignal-based inputs includes (i) receiving a biosignal-based input, (ii) predicting, using a machine learning model trained to predict user input actions from biosignal-based inputs, a user input action from the received biosignal-based input, (iii) processing the predicted user input action to determine a predicted display frame, (iv) pre-rendering, using a graphics processing unit, the predicted display frame, (v) receiving a user input, and (vi) displaying the pre-rendered display frame when the predicted user action conforms to the received user input.

In some examples, the method further includes flushing the pre-rendered display frame from a graphics pipeline of the graphics processing unit in response to the predicted user input action conflicting with the received user input. In some examples, the method further includes rendering, in response to flushing the pre-rendered display frame, a second display frame based on the received user input.

In some examples, the method further includes predicting, based on the received biosignal-based input, a change in user input activity rate, and adjusting, in response to predicting the change in user input activity rate, a power state. In some examples, the method further includes updating the machine learning model using the received biosignal-based input and the received user input.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-8, detailed descriptions of processing adjustments for input lag and/or power reduction using biosignal-based inputs. Detailed descriptions of example systems for processing adjustments using biosignal-based inputs will be provided in connection with FIGS. 1, 3, and 4A-B. Detailed descriptions of input lag stages will be provided in connection with FIG. 2. Detailed descriptions of example machine learning models will be provided in connection with FIG. 3. Detailed descriptions of an example frame sequence will be provided in connection with FIG. 5. Detailed descriptions of corresponding computer-implemented methods will also be provided in connection with FIGS. 6, 7, and 8.

FIG. 1 is a block diagram of an example system 100 for processing adjustments such as for input lag and/or power reduction using biosignal-based inputs. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, accelerated processing units (APUs), portions of one or more of the same, variations or combinations of one or more of the same, and/or any other suitable physical processor.

As also illustrated in FIG. 1, example system 100 includes one or more physical co-processors, such as co-processor 111. Co-processor 111 generally represents any type or form of hardware-implemented processing unit capable of interpreting and/or executing computer-readable instructions, which in some examples works in conjunction and/or based on instructions from processor 110. In some examples, co-processor 111 accesses and/or modifies data and/or instructions stored in memory 120. Examples of co-processor 111 include, without limitation, chiplets, microprocessors, microcontrollers, graphics processing units (GPUs), FPGAs that implement softcore processors, ASICs, SoCs, DSPs, NNEs, accelerators, portions of one or more of the same, variations or combinations of one or more of the same, and/or any other suitable physical processor.

As further illustrated in FIG. 1, processor 110 includes a control circuit 112, and a clock circuit 114, and co-processor 111 includes a graphics pipeline 130. Control circuit 112 corresponds to circuitry (e.g., controllers) and/or instructions for using biosignal-based inputs to reduce input lag as well as modulate system performance of system 100, as described herein. Clock circuit 114 corresponds to circuit for generating a clock signal, as used by system 100. A frequency of the clock signal (which can in some examples be controlled or otherwise modified by control circuit 112) can correspond to the system performance, for example a higher frequency corresponding to a higher performance (while increasing power consumption) and a lower frequency corresponding to a lower performance (while decreasing power consumption). Graphics pipeline 130 generally represents circuitry for rendering graphics (e.g., display frames) for outputting to a display, which can further correspond to one or more stages, including intermediary rendering states and associated data, for rendering graphics. Although FIG. 1 illustrates graphics pipeline 130 with co-processor 111 (e.g., a GPU), in other examples, graphics pipeline 130 can be physically separate from co-processor 111 (e.g., as part of a different instance of co-processor 111, and/or processor 110) and in some implementations be at least partially implemented with software (e.g., via processor 110 and/or memory 120).

FIG. 1 further illustrates a machine learning model 122 which can be implemented with memory 120, processor 110, and/or co-processor 111. As will be described further below, machine learning model 122 can correspond to one or more machine learning (ML) schemes for predicting user input actions from biosignal-based inputs, although in other examples machine learning model 122 can correspond to and/or incorporate any predictive models or conversion techniques for converting biosignal-based inputs into user input actions.

In addition, FIG. 1 illustrates a peripheral device 140, a biosignal device 150, and a bus 102. Peripheral device 140 can correspond to an input device for receiving user inputs, such as a keyboard, mouse, touchscreen, virtual reality controller, etc., that can require an active user action/motion by a user to produce a user input signal for processing. Biosignal device 150 can correspond to a device (e.g., having one or more sensors) for measuring biosignal events, such as an EEG device, which can be external and/or internal to a user's body, to produce biosignal-based input signals from detected biosignals. Bus 102 can correspond to any bus, circuitry, connections, and/or any other communicative pathways for sending communicative signals between devices (e.g., peripheral device 140 and/or biosignal device 150) and/or system 100 (e.g., processor 110, memory 120, and/or co-processor 111). Peripheral device 140 and/or biosignal device 150 can, in some implementations, be external to system 100 and connected thereto via wired and/or wireless connections, although in other implementations peripheral device 140 and/or biosignal device 150 can be at least partially integrated with system 100.

Figure 2:
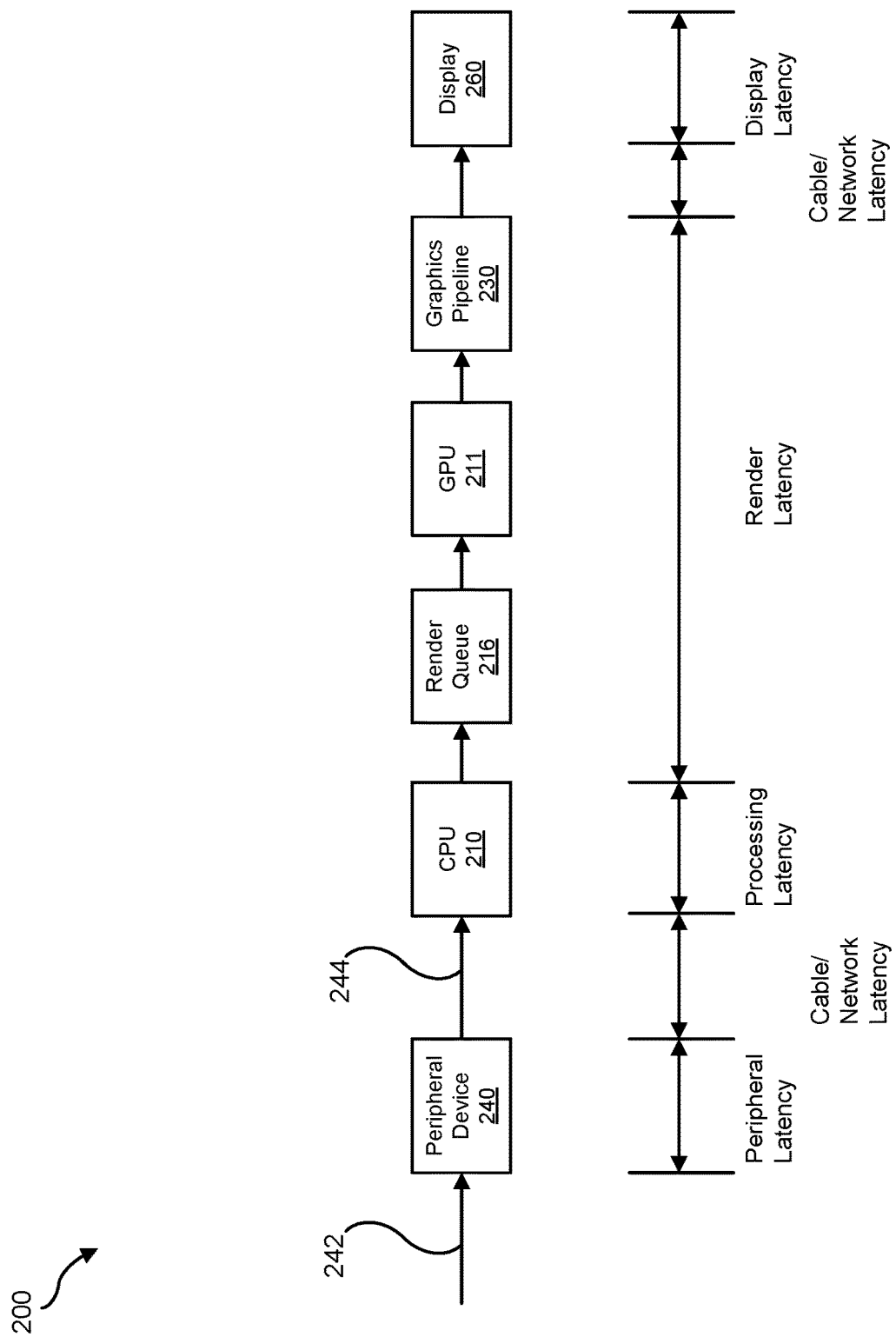
FIG. 2 is a diagram of input lag.

In some scenarios, system 100 can exhibit input lag when relying solely on peripheral device 140, as will be discussed further with respect to FIG. 2. FIG. 2 illustrates a system 200, corresponding to system 100, which is illustrated as a general data flow rather than architecturally to illustrate potential latencies at each stage (which are not drawn to scale). System 200 can include a peripheral device 240 corresponding to peripheral device 140, a CPU 210 corresponding to processor 110, a render queue 216 (e.g., a queue corresponding to instructions for rendering display frames in response to processing updates that can include updates based on user inputs), a GPU 211 corresponding to co-processor 111 (although in some examples can be integrated with CPU 210), a graphics pipeline 230 corresponding to graphics pipeline 130, and a display 260 (e.g., corresponding to a display device such as one or more screens, projectors, waveguides, etc. for visually outputting rendered frames).

A user input action 242 can correspond to an action taken by a user to manipulate peripheral device 240, such as striking a key, moving a mouse or joystick, swiping a screen, moving a virtual reality controller, etc. Peripheral device 240 can, using internal sensors, convert user input action 242 into a user input 244 corresponding to a user input signal to be processed (e.g., a keyboard button signal, a mouse movement signal, a joystick movement/button signal, a screen gesture signal, a virtual reality controller movement, etc.). However, such conversion can incur a peripheral latency, as illustrated in FIG. 2.

Peripheral device 240 can transmit user input 244 to CPU 210 for further processing. However, based on a connection type (e.g., wired using a cable or wireless using a network and/or any other combination or type of connection) between peripheral device 240 and CPU 210, this transmission can incur a cable/network latency, as illustrated in FIG. 2. After receiving user input 244, CPU 210 can process user input 244, for instance processing a response to user input 244 (e.g., a user interface response, software function/interaction, etc.), which further incurs a processing latency.

After processing user input 244, CPU 210 can provide instructions and/or data for rendering one or more frames (e.g., instructions and/or data corresponding to images that produces video output when displayed in sequence), which can be buffered or stored in render queue 216, to output a response to user input 244. GPU 211 can use the instructions/data from render queue 216 to render display frames (e.g., through graphics pipeline 230). As illustrated in FIG. 2, a process for rendering frames can collectively incur a render latency.

Graphics pipeline 230 can output frames ready for display to display 260. Based on a connection type between graphics pipeline 230 (e.g., GPU 211) and display 260, transmitting the frames can incur a cable/network latency. Once display 260 receives the rendered frames, display 260 can output (e.g., visually display) the frames, incurring a display latency.

As illustrated in FIG. 2, various latencies can contribute to an overall input lag between user input action 242 and visually observing a result on display 260. Although certain optimizations are available for each type of latency, these optimizations can require tradeoffs (e.g., by reducing graphical detail or display refresh rates, reducing functionality to reduce processing requirements, etc.) or can be costly or otherwise unfeasible (e.g., replacing hardware components with higher performance alternatives, improving computing conditions/resources, etc.). The systems and methods herein can reduce input lag without requiring similar tradeoffs by using biosignal-based inputs, which are often significantly faster to measure or otherwise receive for processing than user inputs from user input actions. In some examples, a person can produce an EEG signal from hundreds of milliseconds up to two seconds before performing a corresponding physical movement.

Figure 3A:
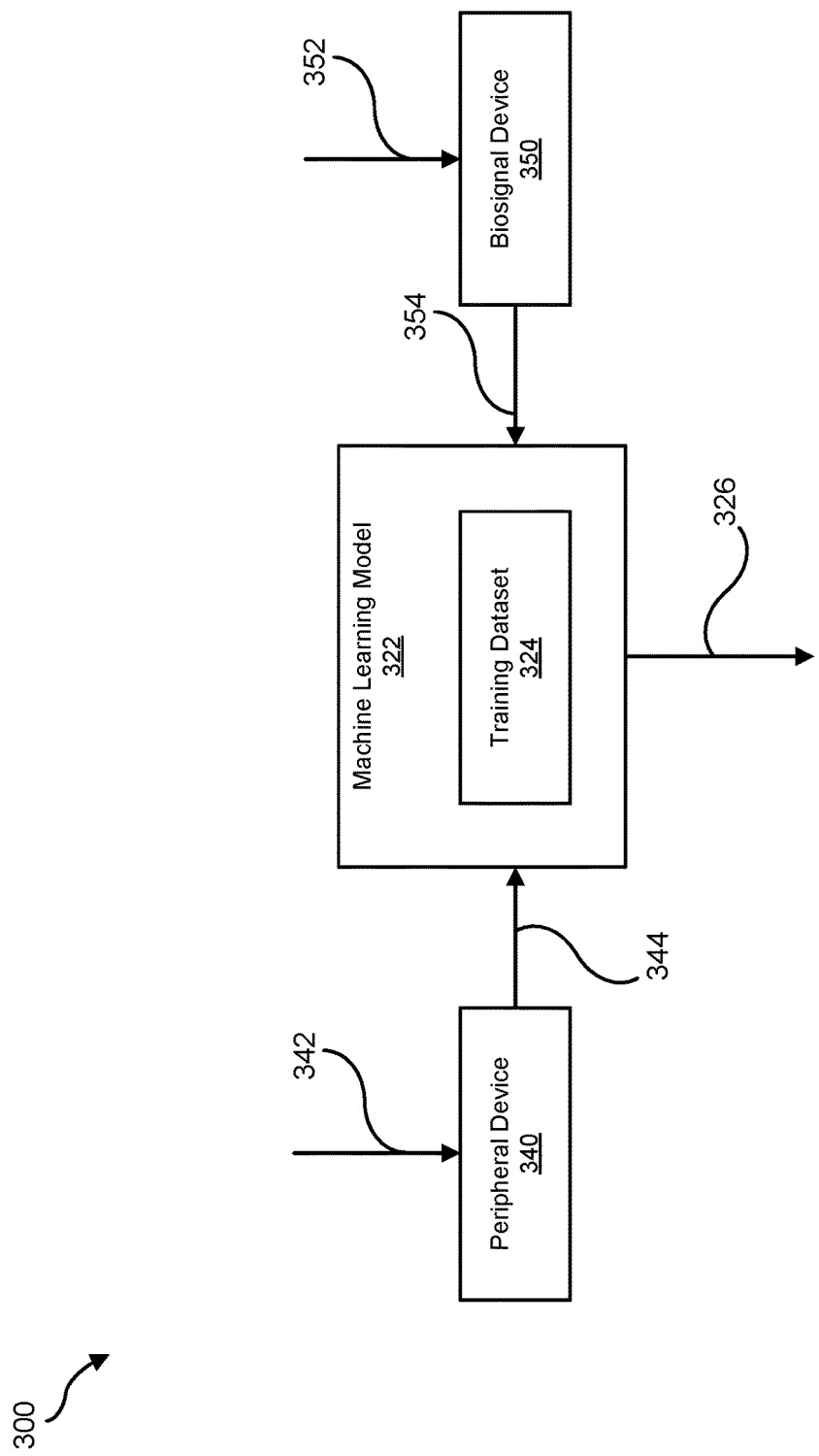
FIGS. 3A-B are diagrams of exemplary machine learning models for biosignal-based inputs.

FIG. 3A illustrates a system 300, corresponding to system 100, which can predict or convert user input actions (and/or user inputs) from biosignal-based inputs. FIG. 3A includes a user input action 342 corresponding to user input action 242, a peripheral device 340 corresponding to peripheral device 240, a user input 344 corresponding to user input 244, a biosignal event 352 (e.g., a measurable physiological event such as brain activity), a biosignal device 350 corresponding to biosignal device 150, a biosignal-based input 354 (e.g., a measurement of biosignal event 352 by biosignal device 350), a machine learning (ML) model 322 corresponding to machine learning model 122, a training dataset 324, and a predicted user input 326.

Machine learning model 322 can correspond to one or more ML schemes, such as a supervised learning model using training dataset 324. In one example, machine learning model 322 can correspond to a decision tree learning scheme (and/or variations thereof), in which machine learning model 322 can receive continuous (or discrete) values as inputs for classification using regression (or classification) trees developed from training dataset 324 by splitting input values into subsets (e.g., based on value ranges) and having leaves corresponding to output values (e.g., classifications and/or probabilities of classifications). In another example, machine learning model 322 can correspond to a linear regression learning model (and/or variations thereof), in which machine learning model 322 uses linear functions fit to training dataset 324 to predict relationships between input and output values. Moreover, although FIG. 3A illustrates ML model 322 separately from biosignal device 350 and peripheral device 340, in some implementations ML model 322 and/or portions thereof can be incorporated with biosignal device 350 and/or peripheral device 340.

Training dataset 324 can include data correlating biosignal-based inputs to user inputs and more specifically include biosignal-based inputs as input values for machine learning model 322 and user input actions and/or user inputs as output values. Thus, machine learning model 322 can be trained to predict user input actions and/or user inputs from biosignal-based inputs. For example, biosignal device 350 can measure biosignal event 352 to provide biosignal-based input 354 to machine learning model 322. Machine learning model 322 can predict predicted user input 326 from biosignal-based input 354. In some example, predicted user input 326 can correspond to a user input signal (e.g., similar to user input signals provided by peripheral device 340) and in other examples can correspond to a user input action to be converted to a user input signal. For the purposes of discussion, in some implementations a user input and a user input action can refer to different signal formats of the same underlying event represented by both, with respect to machine learning model 322. Similarly, in some implementations, a biosignal event and a biosignal-based input can refer to different signal formats of the same underlying event represented by both, with respect to machine learning model 322.

Moreover, in some examples, predicted user input 326 can correspond to, represent, and/or be further used to predict changing trends in user input actions. For example, predicted user input 326 can correspond to the user being and/or becoming inactive (e.g., no longer manipulating peripheral device 340) or otherwise reducing a user input activity rate. Similarly, predicted user input 326 can correspond to the user becoming active (e.g., planning to manipulate peripheral device 340 after being inactive) or otherwise increasing a user input activity rate. Further, biosignal device 350 can correspond to multiple different types of biosignal devices/detectors measuring multiple different types of biosignal events such that biosignal-based input 354 can correspond to a combination of different simultaneous or near-simultaneous events.

In some examples, user input action 342 can succeed biosignal event 352. In other words, when a user manipulates peripheral device 340 for user input action 342, the user can first produce (e.g., as brain activity) biosignal event 352 that is measured by biosignal device 350 (e.g. attached to the user's head) as biosignal-based input 354. The user's body can subsequently perform the action of user input action 342, measured by peripheral device 340 as user input 344 (e.g., an expected output of machine learning model 322). If machine learning model 322 correctly predicts predicted user input 326, predicted user input 326 will conform to (e.g., will be the same as or within a tolerance threshold of) user input 344. Accordingly, in some examples, machine learning model 322 can use user input 344 as feedback for improving predictions. Additionally, user input 344 can be used as feedback for rendering frames, as will be described further below.

Figure 3B:
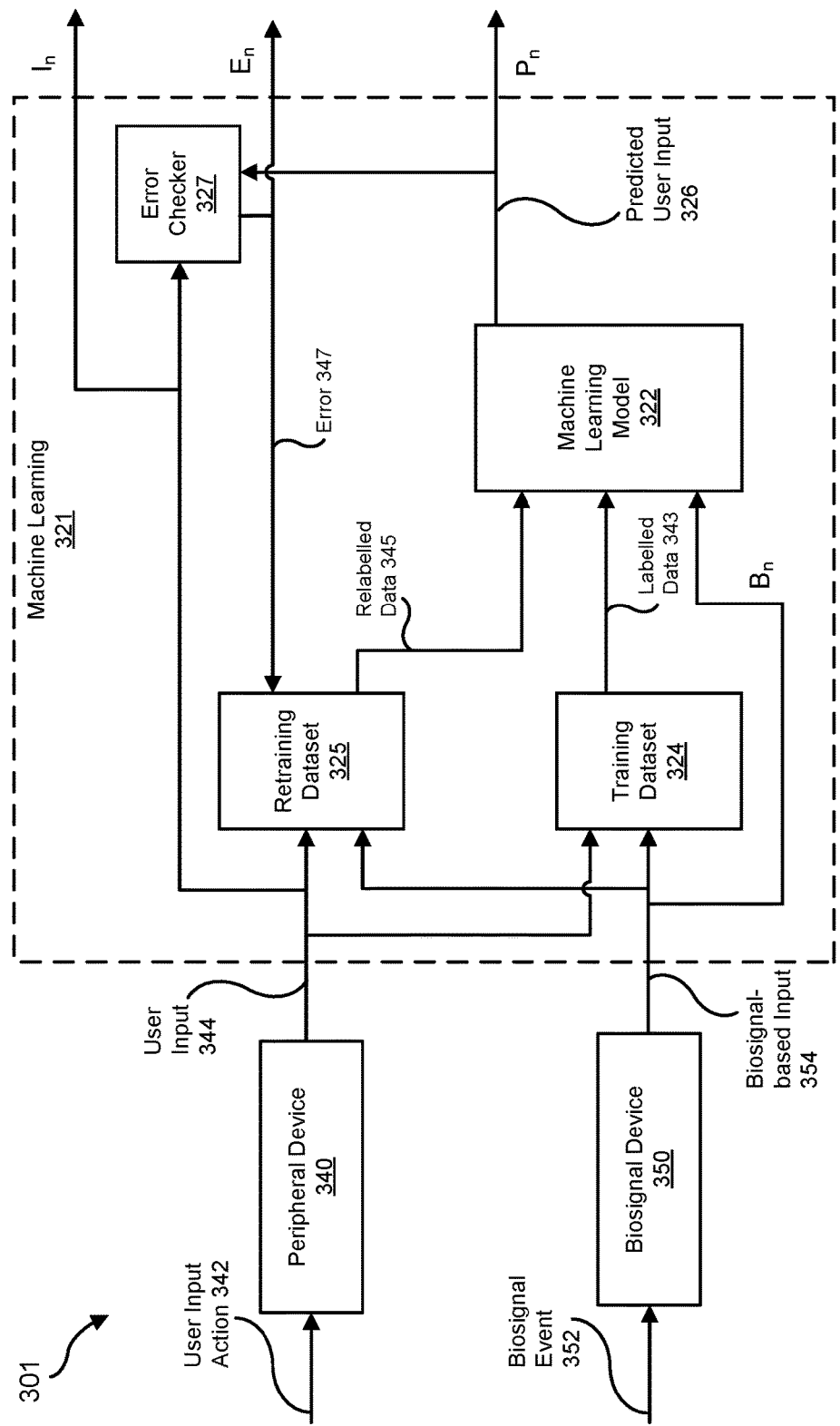

FIG. 3B illustrates a system 301, corresponding to system 100, providing a more detailed alternative of system 300. Predicted output (e.g., prediction $P_n$ corresponding to predicted user input 326) of ML model 322 can be validated against temporally delay user input (e.g., input $I_n$ corresponding to user input 344) from peripheral device 340 such that any errors in predictions can be corrected by relabeling biosignal-based inputs with the actual peripheral input signal to retrain ML model 322. FIG. 3B illustrates an example implementation of a self-training supervised learning algorithm for a machine learning 321 (e.g., an implementation of a machine learning algorithm and/or scheme).

As described herein, training dataset 324 can include labelled data 343 that associates user inputs ($I_n$) with biosignal-based inputs ($B_n$) and fed to ML model 322 for training and generating a model. After training, ML model 322 can make predictions ($P_{n+1}$) of further user inputs ($I_{n+1}$) based on biosignal-based input(s) ($B_{n+1}$). An error checker 327, corresponding to a comparing signals/data, can compare the predicted data/user input ($P_{n+1}$) against temporally delayed user input ($I_{n+1}$) to output an appropriate error 347 ($E_{n+1}$), corresponding to a signal that can indicate an error between predictions (e.g., predicted user input 326) and actual input (e.g., user input 344). The user input ($I_{n+1}$) can be temporally delayed, for example, due to the user's natural delay between producing a biosignal-based input and its corresponding action.

Error checker 327 can indicate an error to correctly relabel (e.g., as relabeled data 345) $B_{n+1}$ with the correct associated user input $I_{n+1}$ in retraining dataset 325, corresponding to a dataset of corrected or otherwise updated training data. As illustrated in FIG. 3B, retraining dataset 325 can be fed user input 344 and biosignal-based input 354 such that receiving a corresponding error 347 can indicate relabeling the associated pair as relabeled data 345. In some implementations, error 347 can correspond to a binary signal/value (e.g., true or logic high indicating an error, false or logic low indicating no error). In some examples, if error 347 does not indicate an error, the corresponding pair of user input 344 and biosignal-based input 354 can be ignored and/or discarded as not being relabeled. Retraining dataset 325 can feed relabeled data 345 to ML model 322 to refine the model. Accordingly, ML model 322 can be continuously refined and updated by repeating this error process as needed.

Figure 4A:
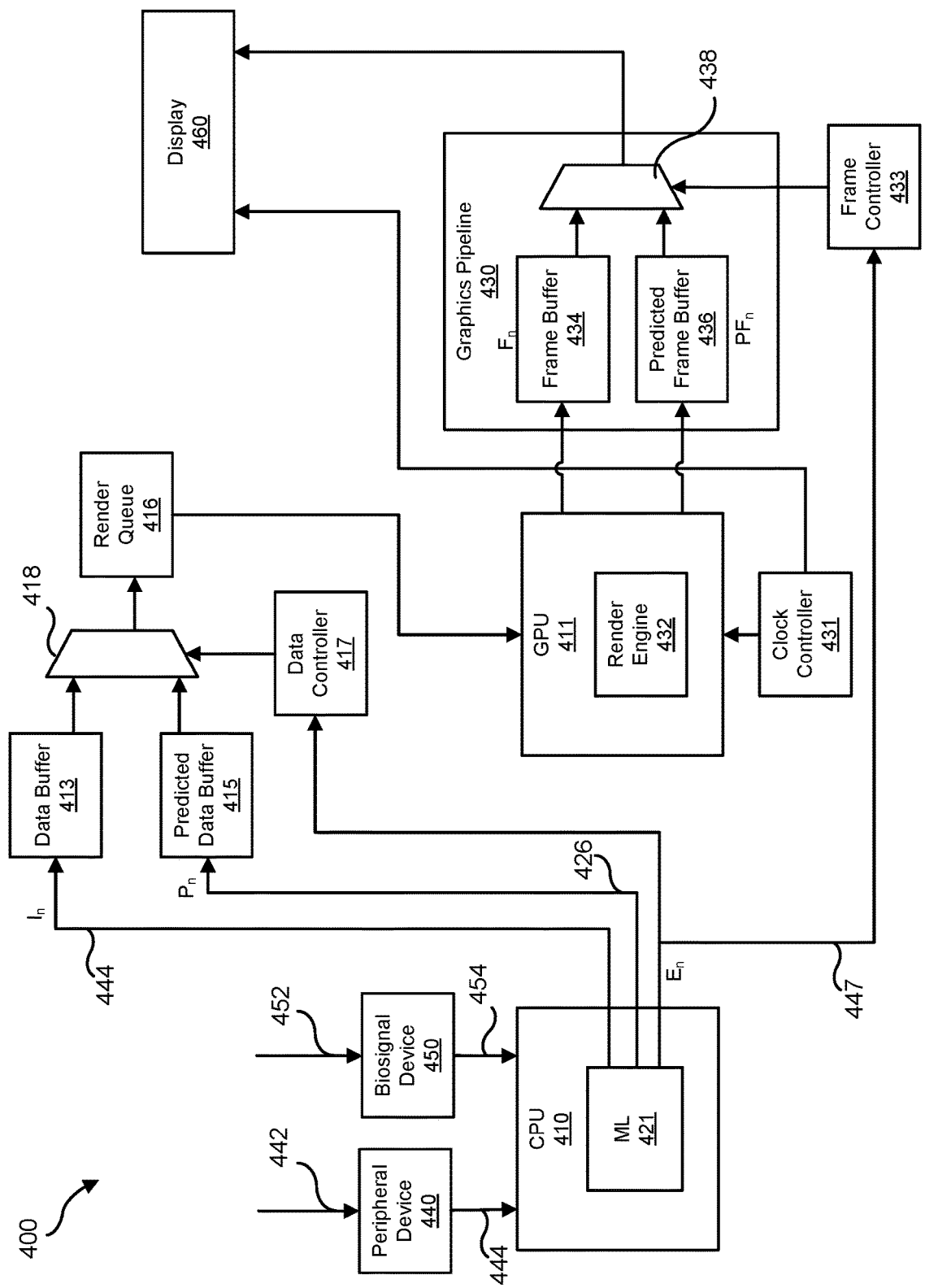
FIG. 4A-B are diagrams of exemplary systems for processing adjustments using biosignal-based inputs.
Figure 4B:
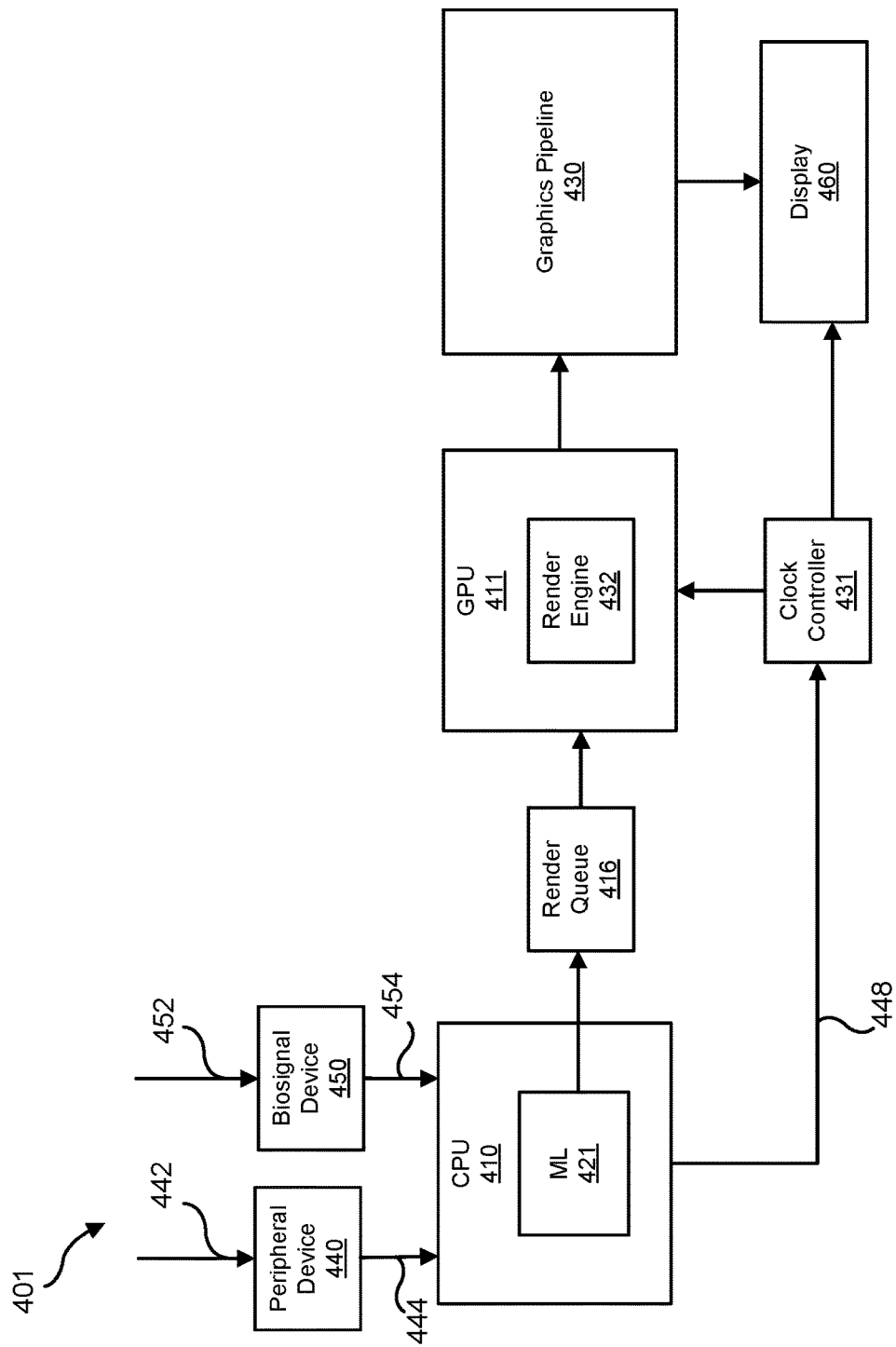

FIGS. 4A and 4B respectively illustrate a system 400 and a system 401, each corresponding to examples system 100, and are each generally depicted as a data flow. FIGS. 4A-B illustrates a user input action 442 corresponding to user input action 342, a peripheral device 440 corresponding to peripheral device 340, and a user input 444 corresponding to user input 344 and $I_n$. FIGS. 4A-B also illustrate a biosignal event 452 corresponding to biosignal event 352, a biosignal device 450 corresponding to biosignal device 350, and a biosignal-based input 454 corresponding to biosignal-based input 354 and $B_n$.

FIGS. 4A and 4B further include a CPU 410 corresponding to an iteration of processor 110, and a render queue 416 corresponding to render queue 216. FIG. 4A further includes (which can be optional in FIG. 4B) a data buffer 413 corresponding to a buffer for holding render information based on user inputs, a predicted data buffer 415 for holding render information based on predicted user inputs, a predicted user input 426 corresponding to predicted user input 326, a multiplexer 418, and a data controller 417 corresponding to a control circuit (e.g., control circuit 112). Multiplexer 418 corresponds to a multiplexer or other circuit configured to select between data buffer 413 and predicted data buffer 415 for outputting render information to render queue 416 based on control signals from data controller 417.

FIGS. 4A and 4B also include a GPU 411 corresponding to another iteration of processor 110, a graphics pipeline 430 corresponding to graphics pipeline 230, a display 460 corresponding to display 260, and a clock controller 431 corresponding to a control circuit (e.g., control circuit 112) for a clock circuit (e.g., clock circuit 114). FIG. 4A also includes (which can be optional in FIG. 4B) a frame controller 433 corresponding to a control circuit (e.g., control circuit 112), and an error 447 corresponding to error 347 and $E_n$. FIG. 4B further includes (which can be optional in FIG. 4A) an adjustment signal 448.

As illustrated in FIGS. 4A and 4B, CPU 410 includes an ML 421 corresponding to ML 321 and/or machine learning model 122, GPU 411 includes a render engine 432 (e.g., one or more processing units for rendering frames). In FIG. 4A, graphics pipeline 430 includes a frame buffer 434 (which can be included in FIG. 4B but not shown) for holding frames ($F_n$) based user inputs (e.g., user input 444 and/or $I_n$), a predicted frame buffer 436 for holding predicted frames ($PF_n$) based on predicted user inputs (e.g., predicted user input 426 and/or $P_n$), and a multiplexer 438.

In one example, CPU 410 can receive biosignal-based input 454, as measured by biosignal device 450 from biosignal event 452. Using ML 421, CPU 410 can predict a user input action (e.g., predicted user input 426) from biosignal-based input 454 and further predict one or more corresponding display frames. More specifically, CPU 410 can process the predicted user input action (e.g., as predicted user input 426) to predict frames to render, and accordingly provide instructions/data to predicted data buffer 415 as a job for submitting to render queue 416. GPU 411 can pre-render (e.g., render before an actual instruction to render as would normally be triggered such as by a user input) the frames from the instructions/data of render queue 416. GPU 411 can store the pre-rendered or predicted frames $PF_n$ in predicted frame buffer 436 (e.g., a buffer for storing rendered frames to be output to a display device). Accordingly, CPU 410 and/or GPU 411 can pre-render one or more display frames based on biosignal-based input 454.

If the predicted physical movements ($P_n$) are not consistent with the temporally delayed user input ($I_n$), the predicted frames ($PF_n$) can be flushed out of graphics pipeline 430 at an output of GPU 411. The incorrect predicted frames ($PF_n$) can be replaced by frames ($F_n$) generated from peripheral device 440. In some examples, CPU 410 can receive user input 444 as detected by peripheral device 440 from user input action 442. CPU 410 can determine whether the predicted user input conforms with or conflicts with user input 444 and send error 447 as will be explained further below.

CPU 410 and/or ML 421 can compare (using, e.g., error checker 327) $P_n$ to temporally delayed user input $I_n$ to generate $E_n$ for each input. If the prediction is incorrect, ML 421 can output $E_n$ (e.g., error 447) to data controller 417 and/or frame controller 433. Each job submitted to render queue 416 can include metadata indicating whether the job corresponds to a predicted frame $PF_n$ (e.g., is from predicted data buffer 415) or an actual user input frame $F_n$ (e.g., is from data buffer 413) along with an identification number (e.g., corresponding to n) for tracking of inputs and corresponding frames. Based on error 447 indicating an error, data controller 417 can control multiplexer 418 to submit a job from data buffer 413 corresponding to the erroneous prediction.

ML 421 can further propagate error 447, further corresponding to a feedback signal, downstream to frame controller 433 that controls multiplexer 438. Multiplexer 438 corresponds to a multiplexer or other circuit configured to select between frame buffer 434 and predicted frame buffer 436 for outputting rendered display frames to display 460. In some implementations, multiplexer 438 can maintain a strict ordering of frames regardless of source (e.g., switching seamlessly between frame buffer 434 and predicted frame buffer 436 without skipping frames), as will be explained further below with respect to FIG. 5.

In some examples, error 447 can correspond to a selection signal (e.g., for selecting output from between frame buffer 434 and predicted frame buffer 436). In some implementations, error 447 can include additional instructions, such as identifiers for which specific frames (e.g., from predicted frame buffer 436 and/or frame buffer 434) to drop and/or instructions for flushing a buffer and/or graphics pipeline 430. Based on error 447 indicating that the predicted user input $P_n$ (and the corresponding pre-rendered or predicted frames $PF_n$) conforms with user input 444, multiplexer 438 can output the corresponding pre-rendered or predicted frames from predicted frame buffer 436 to display 460 for displaying.

Figure 5:
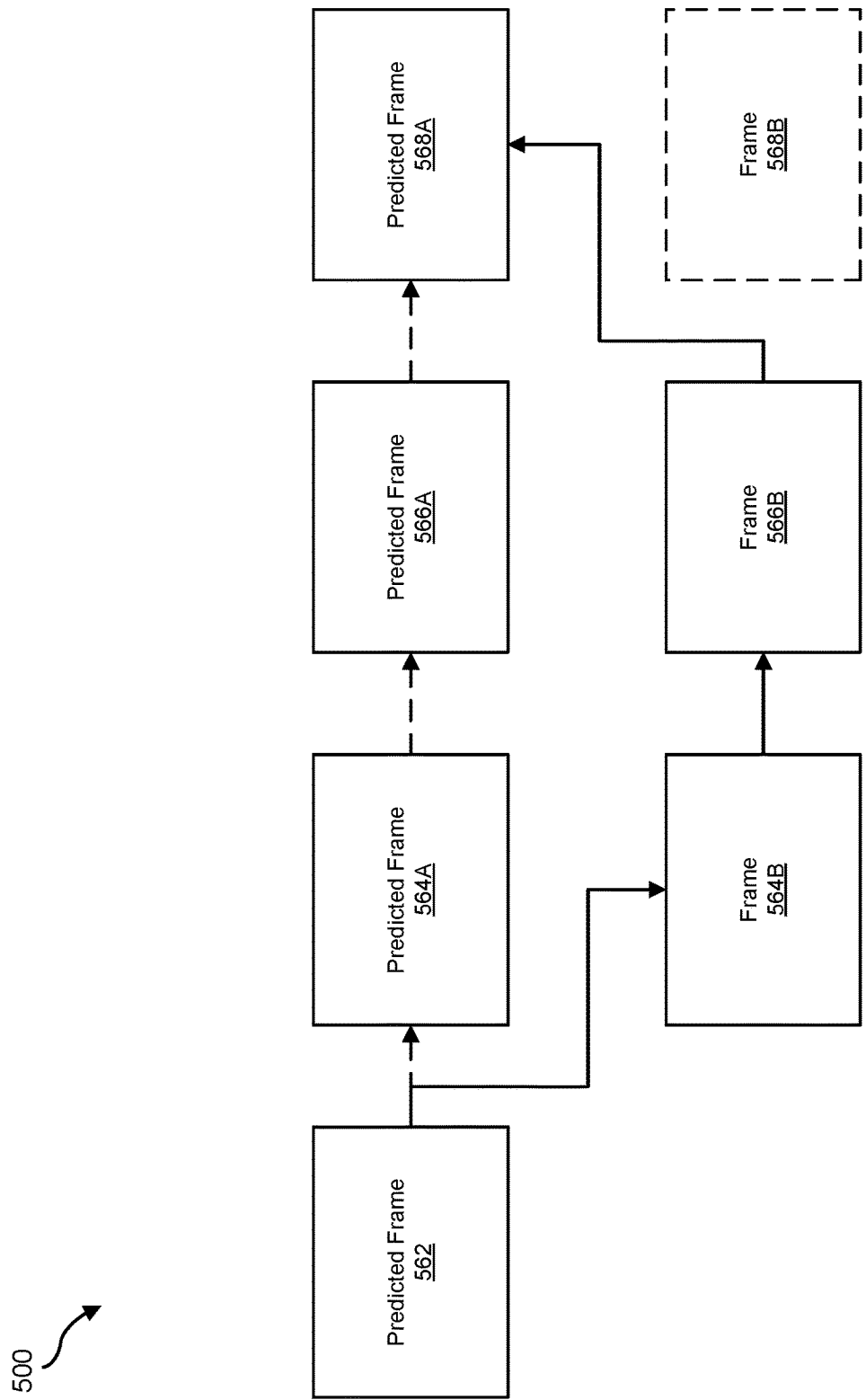
FIG. 5 is a diagram of an example frame sequence.

In some examples, the predicted user input (and the corresponding pre-rendered frames) can conflict with user input 444, for example, the predicted user input exceeding a tolerance or error threshold with respect to user input 444 and/or the pre-rendered frames differing from frames to be rendered in response to user input 444. In such examples, CPU 410 can send error 447 to flush or otherwise drop the corresponding frames from graphics pipeline 430, which in some examples includes dropping the pre-rendered frames from predicted frame buffer 436, preventing output (e.g., using multiplexer 438) of the pre-rendered frames to display 460, skipping over the pre-rendered frames, etc. FIG. 5 illustrates an example flushing of pre-rendered frames.

FIG. 5 illustrates a diagram 500 of rendered frames that can be output to a display (e.g., display 460). FIG. 5 includes predicted frames (e.g., pre-rendered frames as can be buffered in predicted frame buffer 436) such as a predicted frame 562, a predicted frame 564A, a predicted frame 566A, and a predicted frame 568A that can be pre-rendered based on one or more predicted user inputs. FIG. 5 also includes rendered frames (e.g., frames as can be buffered in frame buffer 434) such as a frame 564B and a frame 566B that can be rendered based on one or more received user inputs. Each of the frames illustrated in FIG. 5 can further correspond to more than one frame (e.g., multiple frames corresponding to a particular discrete input).

In one example, predicted frame 562 can be output. However, a next frame in the sequence (e.g., predicted frame 564A) can conflict with the received user input such that frame 564B is instead output (e.g., using multiplexer 438 to switch output from predicted frame buffer 436 to frame buffer 434). In some examples, outputting frame 564B can include waiting for frame 564B to be rendered (e.g., from CPU 410 based on the received user input and proceeding through a render process until buffered in frame buffer 434). Predicted frame 566A can also conflict with the received user input (e.g., as a series of frames and/or in response to a newly received user input) such that frame 566B is output instead. Predicted frame 568A can conform with a next received user input and is accordingly output (e.g., using multiplexer 438 to switch output from frame buffer 434 to predicted frame buffer 436). In some examples, a corresponding frame 568B can be skipped for rendering (e.g., via CPU 410 halting the render process for the user input).

Returning to FIG. 4A, although in some examples outputting pre-rendered frames from predicted frame buffer 436 can include waiting on confirmation from CPU 410 (e.g., waiting on user input 444), having the pre-rendered frames already available for output upon receiving user input 444 can reduce input lag, as described herein. Moreover, in some examples, CPU 410 (and/or a power management controller thereof) can further enact power management policies in response to the predicted user inputs.

In some implementations, such as in FIG. 4A and/or FIG. 4B, CPU 410 can predict a change in user input activity rate, as described above, and adjust a power state of system 401 (and/or system 400 in FIG. 4A), which can include adjusting a clock frequency, a frame rate (e.g., a rate at which frames are rendered), a supply voltage (e.g., a voltage supplied to components of system 401 such as GPU 411), power gating (e.g., reducing or otherwise shutting off power supplied to components of system 401) and other power state adjustments (e.g., throttling components, selectively placing components into lower power states, adjusting/reducing performance, and/or undoing the adjustments described). For example, in response to predicting a reduced user input activity, CPU 410 can reduce the clock frequency and/or reduce the frame rate via adjustment signal 448 sent to clock controller 431. A reduced user input activity can correspond to reduced computing demands as well as reduced graphical updates. Reducing the clock frequency and/or frame rate, allows reduced power consumption without suffering performance losses that would negatively impact a user experience. Increasing the clock frequency and/or frame rate can improve performance while increasing power consumption. However, in response to predicting an increased user input activity (e.g., the user becoming active after an inactive period), CPU 410 can preemptively increase performance by increasing the clock frequency and/or frame rate to meet predicted computing demands. Moreover, CPU 410 and/or a related control circuit (e.g., an iteration of control circuit 112 that corresponds to a power management circuit) can additionally and/or alternatively perform various other preemptive power management functions, such as decreasing the power state in response to predicting the reduced user input activity, and/or increasing the power state in response to predicting the increased user input activity.

In FIGS. 4A and/or 4B, clock controller 431 can adjust the clock frequency of GPU 411 and/or adjust the frame rate of display 460. In some examples, clock controller 431 can further control other power and/or performance aspects, such as supply voltage rails, clock frequencies and/or processing rates of other components (e.g., CPU 410, render queue 416, etc.). Alternatively, and/or in addition, CPU 410 can send adjustment signal 448 and/or a corresponding signal to a power controller (e.g., control circuit 112) of a power delivery network for adjusting power/performance states as needed (e.g., preemptively reducing power/performance states in response to predicting reduced user input activity, and/or preemptively increasing power/performance states in response to predicting increased user input activity). As shown in FIG. 4B, clock controller 431 can receive a control signal such as adjustment signal 448 from CPU 410 for increasing and/or decreasing performance as described herein. In some examples, CPU 410 can send one or more of user input 444, predicted user input 426, and error 447 and/or derivations thereof as part of and/or instead of adjustment signal 448. In some examples, CPU 410 can send a separate control signal to the power controller.

Figure 6:
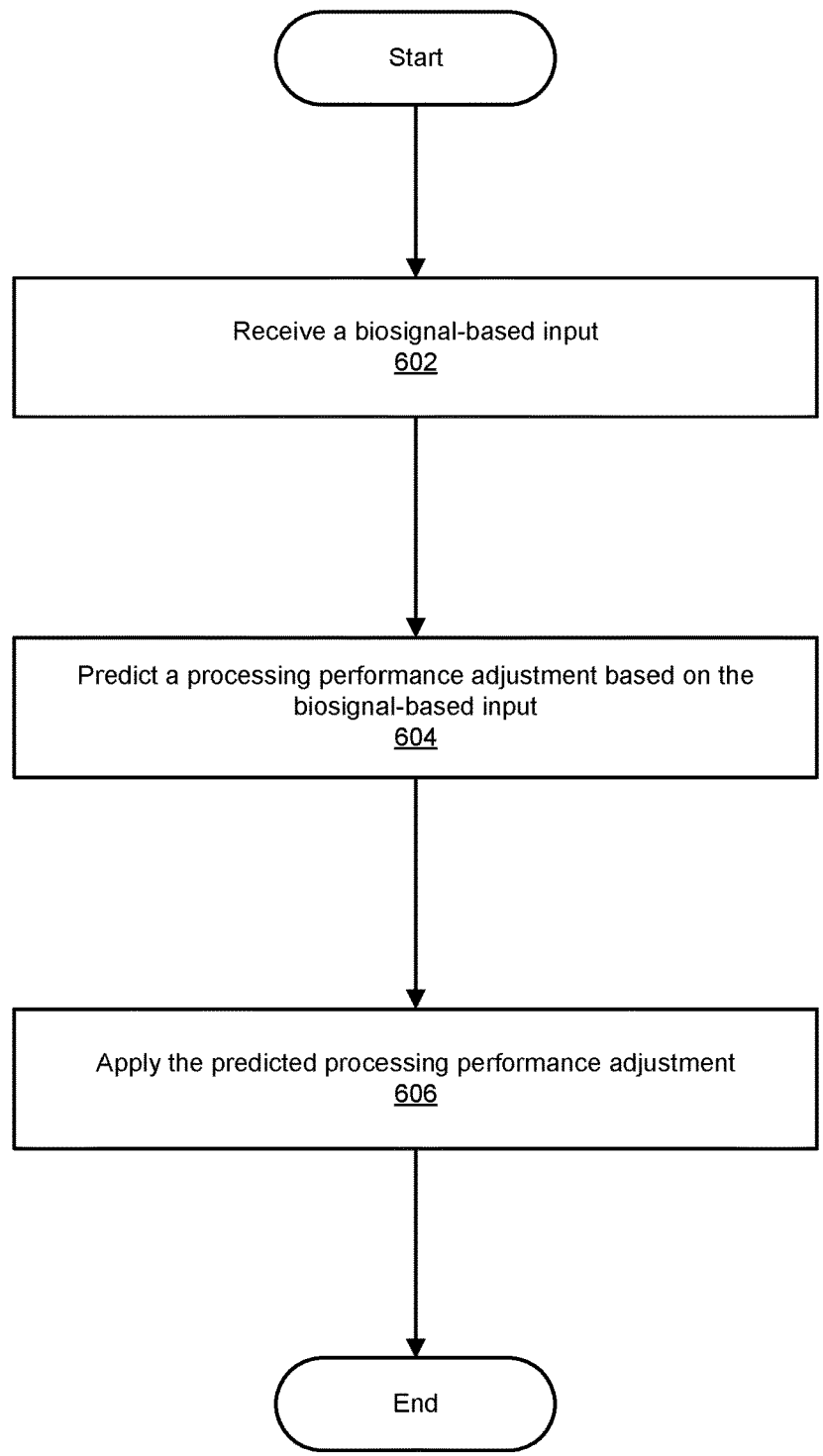
FIG. 6 is a flow diagram of an exemplary method for processing adjustment using biosignal-based inputs.

FIG. 6 is a flow diagram of an exemplary computer-implemented method 600 for processing performance adjustment (e.g., input lag and/or power reduction) using biosignal-based inputs. The steps shown in FIG. 6 can be performed by any suitable computer-executable code and/or computing system, including the system(s) illustrated in FIGS. 1, 2, 3A-B, and/or 4A-B. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein receive a biosignal-based input. For example, system 100 (e.g., processor 110 and/or control circuit 112) receives a biosignal-based input from biosignal device 150.

At step 604, one or more of the systems described herein predict a processing performance adjustment based on the biosignal-based input. For example, processor 110 and/or control circuit 112 can predict a processing performance adjustment.

The systems described herein can perform step 604 in a variety of ways. In some examples, the processing performance adjustment can correspond to reducing input lag (e.g., by pre-rendering frames) and/or reducing power consumption (e.g., by reducing performance). Processor 110 and/or control circuit 112 can use machine learning model 122 to make user input-related predictions from the received biosignal-based input. For example, control circuit 112 can predict, based on the received biosignal-based input, a change in user input activity rate. Based on the predicted change in the user input activity rate, control circuit 112 can perform power management actions. In some examples, control circuit 112 can use different mechanisms for predictions in addition to or alternatively to machine learning model 122, such as lookup tables, heuristics, etc.

In some examples, co-processor 111 (and/or graphics pipeline 130) can pre-render a predicted display frame based on the biosignal-based input. For instance, processor 110 and/or control circuit 112 can predict, based on the received biosignal-based input and using machine learning model 122, a user input action. Processor 110 can predict, based on the predicted user input action, one or more display frames (e.g., by processing the predicted user input action similar to an actual user input to predict resulting display frames).

At step 606, one or more of the systems described herein apply the predicted processing performance adjustment. For example, processor 110 and/or control circuit 112 can perform the predicted processing adjustment.

The systems described herein can perform step 606 in a variety of ways. In some examples, control circuit 112 can, in response to the prediction, adjust a clock frequency of clock circuit 114, for instance decreasing the clock frequency in response to a reduced user input activity rate and/or increasing the clock frequency in response to an increased user input activity rate. In some examples, control circuit 112 can, in response to the prediction, adjust a frame rate, for instance decreasing the frame rate in response to predicting a reduced user input activity rate and/or increasing the frame rate in response to predicting an increased user input activity rate. In further examples, control circuit 112 can also initiate entry and/or exit of various performance states for system 100 (e.g., processor 110 and/or memory 120), for instance entering high performance states and/or exiting low performance states in response to predicting an increased user input activity rate, and exiting high performance states and/or entering low performance states in response to predicting a reduced user input activity rate.

In some examples, system 100 (e.g., processor 110 and/or control circuit 112) receives a user input (e.g., from peripheral device 140), which can be separate from receiving the biosignal-based input. Control circuit 112 can use the user input as feedback for machine learning model 122. In some examples, system 100 can receive multiple sets of biosignal-based inputs and successive user inputs such that system 100 (e.g., processor 110 and/or clock circuit 114) can temporally track matching sets of biosignal-based inputs and corresponding user inputs. For example, processor 110 can associate timestamps with received biosignal-based inputs and user inputs and matching pairs based on an expected time offset there between. In some examples, machine learning model 122 can further incorporate timestamps such that biosignal-based inputs can further be interpreted based on time (e.g., time between biosignal-based inputs and/or corresponding user inputs, increasing and/or decreasing time periods of measured biosignal-based inputs such as using longer and/or shorter biosignal-based inputs, etc.). In some examples, biosignal-based inputs and/or user inputs can be received as continuous signals and/or discrete signals. In some examples, control circuit 112 can track a series of predicted user inputs with a parallel track of received user inputs for matching corresponding pairs. Further, in some examples control circuit 112 can match one or more biosignal-based inputs (e.g., simultaneous and/or near simultaneous biosignal-based inputs measured from one or more biosignal-based input devices) with one or more user inputs (e.g., simultaneous and/or near simultaneous user inputs from one or more peripheral devices), which in some implementations can be converted and/or interpreted as a single (combined) biosignal-based input and single (combined) user input.

Further, system 100 (e.g., co-processor 111 and/or graphics pipeline 130) can output the pre-rendered display frame (e.g., to a connected display) when the pre-rendered display frame conforms with the received user input.

In some examples, control circuit 112, using machine learning model 122, can determine whether the pre-rendered display frame conforms with the received user input, for example by determining whether the predicted user input is not within a tolerance threshold of the received user input, if the pre-rendered display frame does not correspond (e.g., matches within an error threshold and/or is based on different rendering instructions/data) to a frame that would be rendered in response to the received user input, etc. In some examples, control circuit 112 can flush the pre-rendered display frame from graphics pipeline 130 when the pre-rendered display frame conflicts (e.g., does not conform) with the received user input. In such examples, a frame based on the received user input can instead be rendered and displayed.

Figure 7:
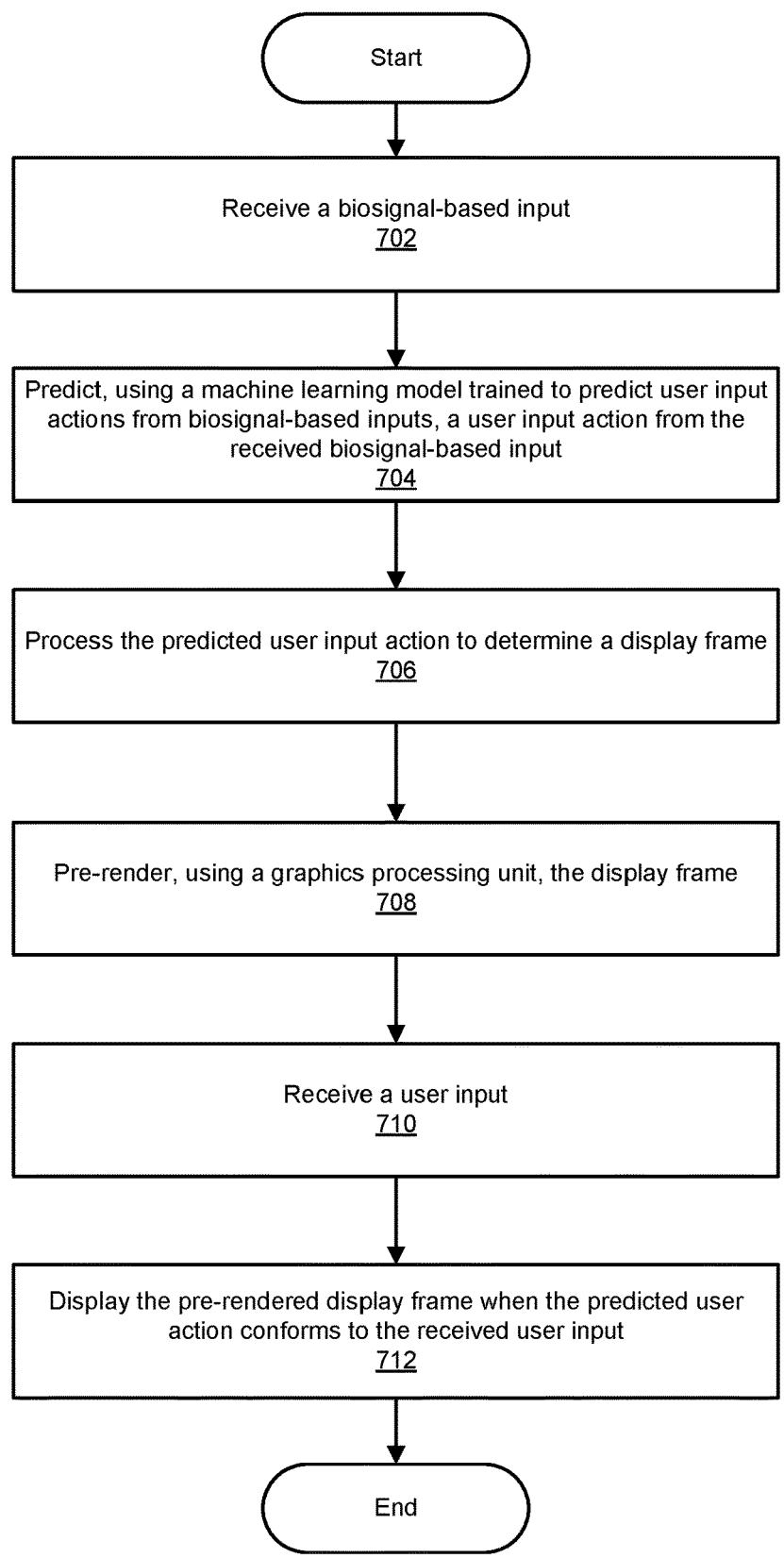
FIG. 7 is a flow diagram of an exemplary method for input lag reduction using biosignal-based inputs.

FIG. 7 is a flow diagram of an exemplary computer-implemented method 700 for processing performance adjustment (e.g., input lag reduction) using biosignal-based inputs. The steps shown in FIG. 7 can be performed by any suitable computer-executable code and/or computing system, including the system(s) illustrated in FIGS. 1, 2, 3A-B, and/or 4A-B. In one example, each of the steps shown in FIG. 7 represent an algorithm whose structure includes and/or is represented by multiple sub-steps, examples of which will be provided in greater detail below.

As illustrated in FIG. 7, at step 702 one or more of the systems described herein receive a biosignal-based input. For example, system 100 (e.g., processor 110 and/or control circuit 112) can receive a biosignal-based input from biosignal device 150 as described herein.

At step 704 one or more of the systems described herein predict, using a machine learning model trained to predict user input actions from biosignal-based inputs, a user input action from the received biosignal-based input. For example, processor 110 (and/or control circuit 112) can predict, using machine learning model 122, a user input action from the received biosignal-based input, as described herein.

At step 706 one or more of the systems described herein process the predicted user input action to determine a display frame. For example, processor 110 can process the predicted user input action to determine one or more display frames, such as to determine appropriate rendering instructions/data as described herein.

At step 708 one or more of the systems described herein pre-render, using a graphics processing unit, the display frame. For example, co-processor 111 (e.g., via graphics pipeline 130) can pre-render the one or more display frames.

At step 710 one or more of the systems described herein receive a user input. For example, system 100 (e.g., processor 110 and/or control circuit 112) receives a user input (e.g., from peripheral device 140) that can be separate from but temporally related to the previously-received biosignal-based input (e.g., such that the user input is the first user input received after the biosignal-based input).

The systems described herein can perform step 710 in a variety of ways. In one example, control circuit 112 can update machine learning model 122 using the received biosignal-based input and the received user input, such as using the received biosignal-based input and the received user input as feedback, updating a training dataset (e.g., training dataset 324), etc.

At step 712 one or more of the systems described herein display the pre-rendered display frame when the predicted user action conforms to the received user input. For example, system 100 can display, using an attached display (e.g., display 460) the one or more pre-rendered display frames when the predicted user action conforms with the received user input, as described herein.

The systems described herein can perform step 712 in a variety of ways. In one example, control circuit 112 can flush the one or more pre-rendered display frames from graphics pipeline 130 of co-processor 111 in response to the predicted user input action conflicting with the received user input. In response to flushing the one or more pre-rendered display frames, co-processor 111 (e.g., via graphics pipeline 130) can render a second display frame (e.g., a second set of one or more display frames) based on the received user input.

Control circuit 112 can further predict, based on the received biosignal-based input, a change in user input activity rate and accordingly adjust, in response to predicting the change in user input activity rate, at least one of a clock frequency or a frame rate.

Figure 8:
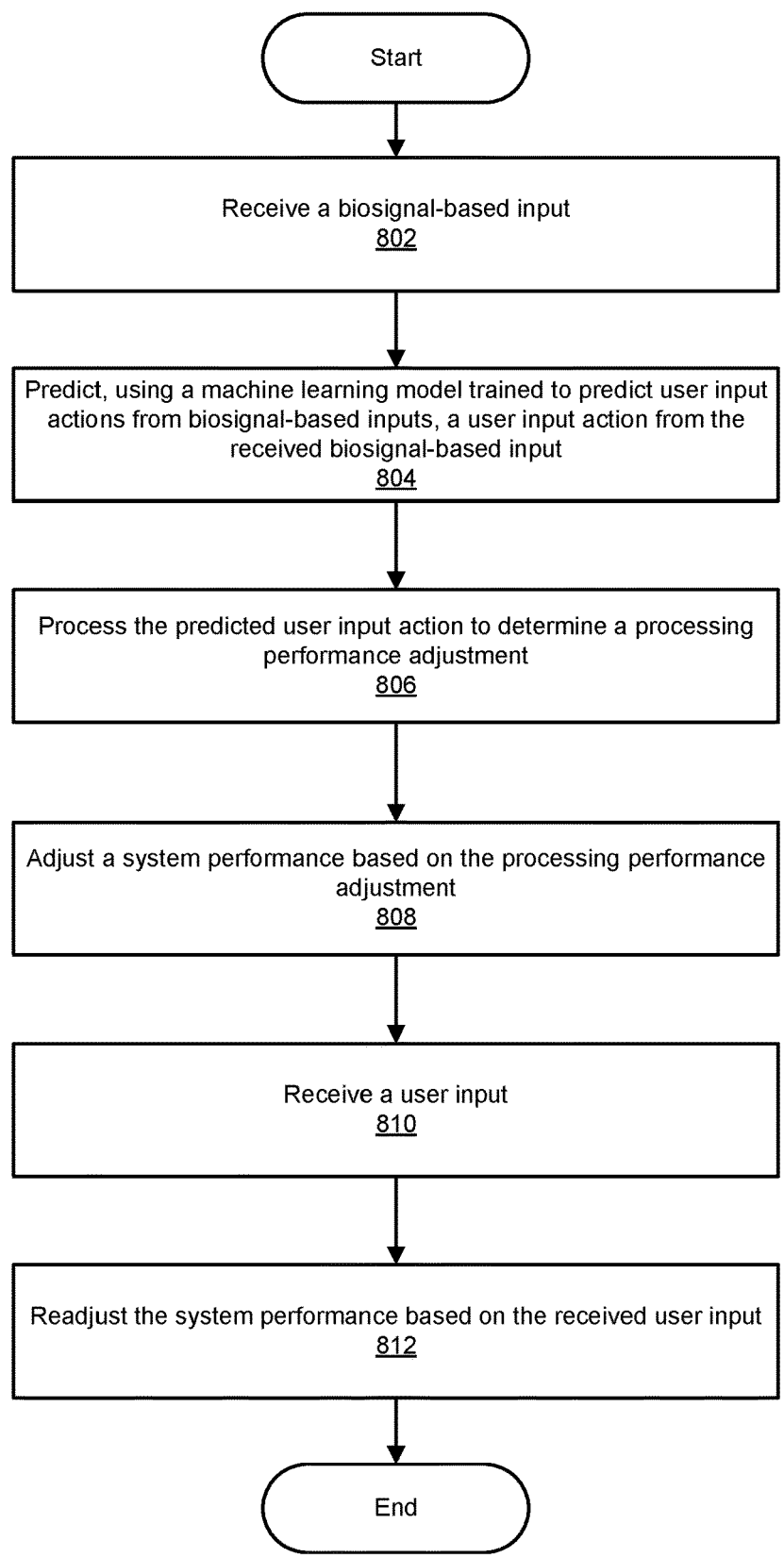
FIG. 8 is a flow diagram of an exemplary method for power reduction using biosignal-based inputs.

FIG. 8 is a flow diagram of an exemplary computer-implemented method 800 for processing performance adjustment (e.g., power consumption reduction) using biosignal-based inputs. The steps shown in FIG. 8 can be performed by any suitable computer-executable code and/or computing system, including the system(s) illustrated in FIGS. 1, 2, 3A-B, and/or 4A-B. In one example, each of the steps shown in FIG. 8 represent an algorithm whose structure includes and/or is represented by multiple sub-steps, examples of which will be provided in greater detail below.

As illustrated in FIG. 8, at step 802 one or more of the systems described herein receive a biosignal-based input. For example, system 100 (e.g., processor 110 and/or control circuit 112) can receive a biosignal-based input from biosignal device 150 as described herein.

At step 804 one or more of the systems described herein predict, using a machine learning model trained to predict user input actions from biosignal-based inputs, a user input action from the received biosignal-based input. For example, processor 110 (and/or control circuit 112) can predict, using machine learning model 122, a user input action from the received biosignal-based input, as described herein.

At step 806 one or more of the systems described herein process the predicted user input action to determine a processing performance adjustment. For example, processor 110 can process the predicted user input action to determine a change in user input activity rate, as described herein.

At step 808 one or more of the systems described herein adjust a system performance (e.g., clock rate, frame rate, performance/power state, etc.) of system 100 based on the processing performance adjustment. For example, processor 110 can increase and/or decrease a clock frequency and/or a frame rate (e.g., for co-processor 111 and/or graphics pipeline 130) as described herein. In some examples, the processing performance adjustment can correspond to no adjustment and/or using normal operating values.

At step 810 one or more of the systems described herein receive a user input. For example, system 100 (e.g., processor 110 and/or control circuit 112) receives a user input (e.g., via peripheral device 140) that can be separate from but temporally related to the previously-received biosignal-based input (e.g., such that the user input is the first user input received after the biosignal-based input).

The systems described herein can perform step 810 in a variety of ways. In one example, control circuit 112 can update machine learning model 122 using the received biosignal-based input and the received user input, such as using the received biosignal-based input and the received user input as feedback, updating a training dataset (e.g., training dataset 324), etc.

At step 812 one or more of the systems described herein readjust the system performance based on the received user input. For example, processor 110 and/or control circuit 112 can adjust the system performance of system 100 in accordance with the received user input (e.g., setting the clock frequency, frame rate, and/or performance/power states appropriate for the received user input).

As detailed above, a game engine (i.e., GPU, CPU) renders images based on various inputs from a user and the application software. The rendered images are then transmitted to a display. The time it takes for the image to be updated on the screen after some physical input from the user (i.e., mouse click) is referred to as input lag.

Input lag can be caused by several factors, including CPU to GPU processing delay, network delay, GPU rendering latencies, etc. The larger the input lag, the longer it will take for the display to respond to the user's inputs (i.e., mouse click), which results in a poor user experience.

Common techniques to reduce the input lag include increase the display refresh rate, continually set GPU clocks to the highest frequencies to reduce the idle to active transition times, turning off VSYNC and displaying the frame as soon as the GPU finishes rendering regardless of where the display is in its scan process (often resulting in tearing in the display), and using a just-in-time render scheme by throttling CPU. Forcing the display refresh rate and/or GPU clocks to the high-frequency state allows fast processing frames of from the CPU, but will consume higher power.

In some cases, the CPU can process frames faster than the GPU can render them, causing the render queue to overfill and consequently increase the rendering latency. A just-in-time render scheme essentially throttles the CPU to prevent the GPU render queue from filling up. By dynamically adjusting the submission timing of rendering work to the GPU, it can process the frames much faster and reduce the overall render latency. However, throttling the CPU can reduce performance, including reducing application performance and/or user input detection.

A person's brain waves, commonly referred to as electroencephalography (EEG) signals, can be measured and associated with a physical movement. A person's EEG signal has a distinct pattern, commonly referred to as the Movement Related Cortical Potential (MRCP), that occurs before the onset of physical movement. This pattern has been measured to precede the user's physical movement in times that can range from 500 ms to 2 sec.

A supervised machine learning algorithm can be trained with a dataset having EEG signals as an input dataset and physical inputs (e.g., mouse clicks) as an output dataset. Thus, the ML algorithm can be trained on these input and output data sets to generate a predicted output after accumulating sufficient data from the user, specifically to make early predictions of the user's future physical movements from their EEG signals.

As described herein, the early prediction of the user's physical inputs can be used by the CPU and GPU to render frames ahead of time and effectively reduce the input lag because the predicted physical movements can precede the actual movement by hundreds of milliseconds. More specifically, the predicted physical movements can be used by the CPU/GPU to render frames earlier in the game engine and thereby reduce the system input lag. For example, the ML algorithm predicts frames ahead of time and submits jobs to the render queue for the GPU to process. Analogous to instruction branch prediction used in a CPU, if the predicted frame is incorrect (e.g., the predicted physical movements are not consistent with the user input), the pre-rendered GPU frames can be flushed from the pipeline (e.g., flushed out of the pipeline at the output of the GPU). The difference between the EEG predicted movements and the actual user input can also be used as feedback to continually refine the supervised ML algorithm.

The prediction can also be used to reduce system power by dynamically reducing the CPU/GPU render rate and clock frequencies when there is no predicted physical movement from the user. In periods when there is no physical input from the user, as predicted by the ML algorithm, the system can lower the clock frequencies and render frames at a lower rate. This allows the system to dynamically reduce power during periods of low activity, which can be more energy efficient than keeping the display refresh rate and/or GPU frequency at a constant high value to reduce the input lag. This can further reduce or eliminate any stuttering effects because it can predict future movements from the user, several hundreds of milliseconds in advance. Accordingly, the system can increase the frame rate and clock frequencies well before the actual physical movement.

As detailed above, certain techniques for reducing input lag require a lot of power, as it requires increasing the display refresh rate and/or GPU clock frequencies. The systems and methods described herein advantageously provides a lower-power solution since it can predict a user's physical movements using their EEG signals. The CPU/GPU can dynamically render frames at a lower rate and lower the clock frequencies when the user is idle and not making any physical movements. This can lower the system power since the CPU/GPU doesn't have to continuously render frames at a high rate during periods of low activity.

In some examples, the term "memory device" generally refers to any type or form of volatile or non-volatile storage device or medium capable of storing data and/or computer-readable instructions. In one example, a memory device stores, loads, and/or maintains one or more of the programs/instructions and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more instructions stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a control circuit configured to:
receive, from a biosignal device, a biosignal-based input that is separate from a user input produced by an active user motion with a peripheral device;
predict a processing performance adjustment based on predicting the active user motion from the biosignal-based input; and
apply the predicted processing performance adjustment.

2. The device of claim 1, wherein:
the processing performance adjustment corresponds to pre-rendering a predicted display frame in a graphics pipeline in response to the biosignal-based input; and
the control circuit is further configured to:
receive the user input from the peripheral device after pre-rendering the predicted display frame; and
confirm that the predicted display frame conforms to the received user input.

3. The device of claim 2, wherein the control circuit is further configured to flush the predicted display frame from the graphics pipeline when the predicted display frame conflicts with the received user input.

4. The device of claim 2, wherein pre-rendering the predicted display frame comprises:
predicting, based on the received biosignal-based input, a user input action corresponding to the active user motion; and
rendering, based on the predicted user input action, the predicted display frame.

5. The device of claim 4, wherein predicting the user input action further comprises predicting, using a machine learning model trained to convert biosignal-based inputs into user input actions, the user input action from the received biosignal-based input.

6. The device of claim 5, wherein the control circuit is further configured to use the user input as feedback for the machine learning model.

7. The device of claim 1, wherein:
the control circuit is configured to predict the processing performance adjustment by predicting, based on the received biosignal-based input, a change in user input activity rate; and
the control circuit is configured to apply the processing performance adjustment by adjusting a power state of the device based on the predicted change in user input activity rate.

8. The device of claim 7, wherein adjusting the power state further comprises:
decreasing the power state in response to predicting a reduced user input activity rate; and
increasing the power state in response to predicting an increased user input activity rate.

9. The device of claim 8, wherein decreasing the power state includes at least one of:
decreasing a clock frequency;
decreasing a frame rate;
decreasing a voltage level supplied to one or more components of the device; and
power gating the one or more components of the device.

10. The device of claim 8, wherein increasing the power state includes at least one of:
increasing a clock frequency;
increasing a frame rate;
increasing a voltage level supplied to one or more components of the device; and
exiting power gating the one or more components of the device.

11. A system comprising:
a biosignal device;
a peripheral device;
a co-processor corresponding to a graphics pipeline; and
a control circuit configured to:
receive, from the biosignal device, a biosignal-based input that is separate from a user input produced by an active user motion with the peripheral device;
predict a user input action, from the received biosignal-based input, that corresponds to the active user motion;
pre-render, using the co-processor, one or more predicted display frames based on the predicted user input action;
receive, from the peripheral device, the user input produced by the active user motion; and
flush the one or more pre-rendered display frames from the graphics pipeline when the predicted user input action conflicts with the received user input.

12. The system of claim 11, wherein the control circuit is configured to instruct the graphics pipeline to output the one or more pre-rendered display frames based on the predicted user input action conforming with the received user input.

13. The system of claim 11, wherein the control circuit is configured to:
predict, based on the received biosignal-based input, a reduced user input activity; and
in response to predicting the reduced user input activity, reduce a power state of the system.

14. The system of claim 11, wherein the control circuit is configured to:
predict, based on the received biosignal-based input, an increased user input activity; and
in response to predicting the increased user input activity, increase a power state of the system.

15. The system of claim 11, wherein predicting the user input action further comprises predicting, using a machine learning model trained to convert biosignal-based inputs into user input actions, the user input action from the received biosignal-based input.

16. The system of claim 15, wherein the control circuit is further configured to use the user input as feedback for the machine learning model.

17. A method comprising:
receiving, from a biosignal device, a biosignal-based input that is separate from a user input produced by an active user motion with a peripheral device;
predicting, using a machine learning model trained to predict user input actions from biosignal-based inputs, a user input action, from the received biosignal-based input, that corresponds to the active user motion;
processing the predicted user input action to determine a predicted display frame;
pre-rendering, using a co-processor, the predicted display frame;
receiving, from the peripheral device, the user input produced by the active user motion; and
displaying the pre-rendered display frame when the predicted user action conforms to the received user input.

18. The method of claim 17, further comprising:
flushing the pre-rendered display frame from a graphics pipeline of the co-processor in response to the predicted user input action conflicting with the received user input; and
rendering, in response to flushing the pre-rendered display frame, a second display frame in response to the received user input.

19. The method of claim 17, further comprising:
predicting, based on the received biosignal-based input, a change in user input activity rate; and
adjusting, in response to predicting the change in user input activity rate, a power state.

20. The method of claim 17, further comprising updating the machine learning model using the received biosignal-based input and the received user input.

* * * * *